United States Patent  
Fujinami (10) Patent No.: US 6,304,717 B1
(45) Date of Patent: Oct. 16, 2001

(54) RECORDING APPARATUS AND METHOD, REPRODUCING APPARATUS AND METHOD, AND RECORDING MEDIUM

(75) Inventor: Yasushi Fujinami, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/140,950

(22) Filed: Aug. 27, 1998

(30) Foreign Application Priority Data

Aug. 29, 1997 (JP) .................................................. 9-234984

(51) Int. Cl.[7] .................................................... H04N 5/917
(52) U.S. Cl. ............................................. 386/111; 386/125
(58) Field of Search ................................. 386/95–96, 98, 386/111–112, 125–126, 109; 348/408.1; 714/775, 755, 769, 701

(56) References Cited

U.S. PATENT DOCUMENTS 5,557,419 * 9/1996 Muto ...................................... 386/111
5,596,581    1/1997 Saeijs et al. .
5,878,187 * 3/1999 Kubota et al. ......................... 386/95
5,983,387 * 11/1999 Nagai et al. .......................... 714/775
6,115,537 * 9/2000 Yamada et al. ...................... 386/109

FOREIGN PATENT DOCUMENTS 195 22 326   12/1995 (DE) .
8-7540        1/1996 (JP) .

* cited by examiner

Primary Examiner—Wendy R. Garber
Assistant Examiner—Christopher Onuaku
(74) Attorney, Agent, or Firm—Frommer Lawrence & Haug LLP; William S. Frommer (57) ABSTRACT

A transmission format signal is recorded on a recording medium capable of recording a large volume of transmission format signals with no occurrence of any redundant part. The recording medium is closely filled with transport packets each of 188 bytes in size, composing together an MPEG2 transport stream in such a manner that no redundant part will exist in each sector of 2048 bytes in size.

4 Claims, 6 Drawing Sheets

RECORDING APPARATUS AND METHOD, REPRODUCING APPARATUS AND METHOD, AND RECORDING MEDIUM

BACKGROUND OF THE INVENTION

1. Field of the Invention

The present invention relates to an apparatus, method, etc. for recording a transmission format signal into a recording medium.

2. Description of Related Art

The MPEG (Moving Picture Experts Group) prescribes a transport stream consisting of compressed audio and video signals. The transport stream is composed of more than one transport packet. There is no data between the transport packets in the transport stream.

The transport packet has at the top thereof a sync_byte of 1 byte to discriminate the transport packet, and has a transport_error_indicator, payload_unit_start_indicator, transport_priority, PID (packet_Identification), transport_scrambling_control, and an adaptation_field_control.

The value of the sync_byte is "01000111 (0×47 in hexadecimal notation)". The transport packet has always a length of 188 bytes. A data byte has recorded therein compressed video and audio signals.

A conventional reproducing apparatus capable of reproducing data recorded in such a recording medium will be described with reference to FIG. 1.

Figure 1:
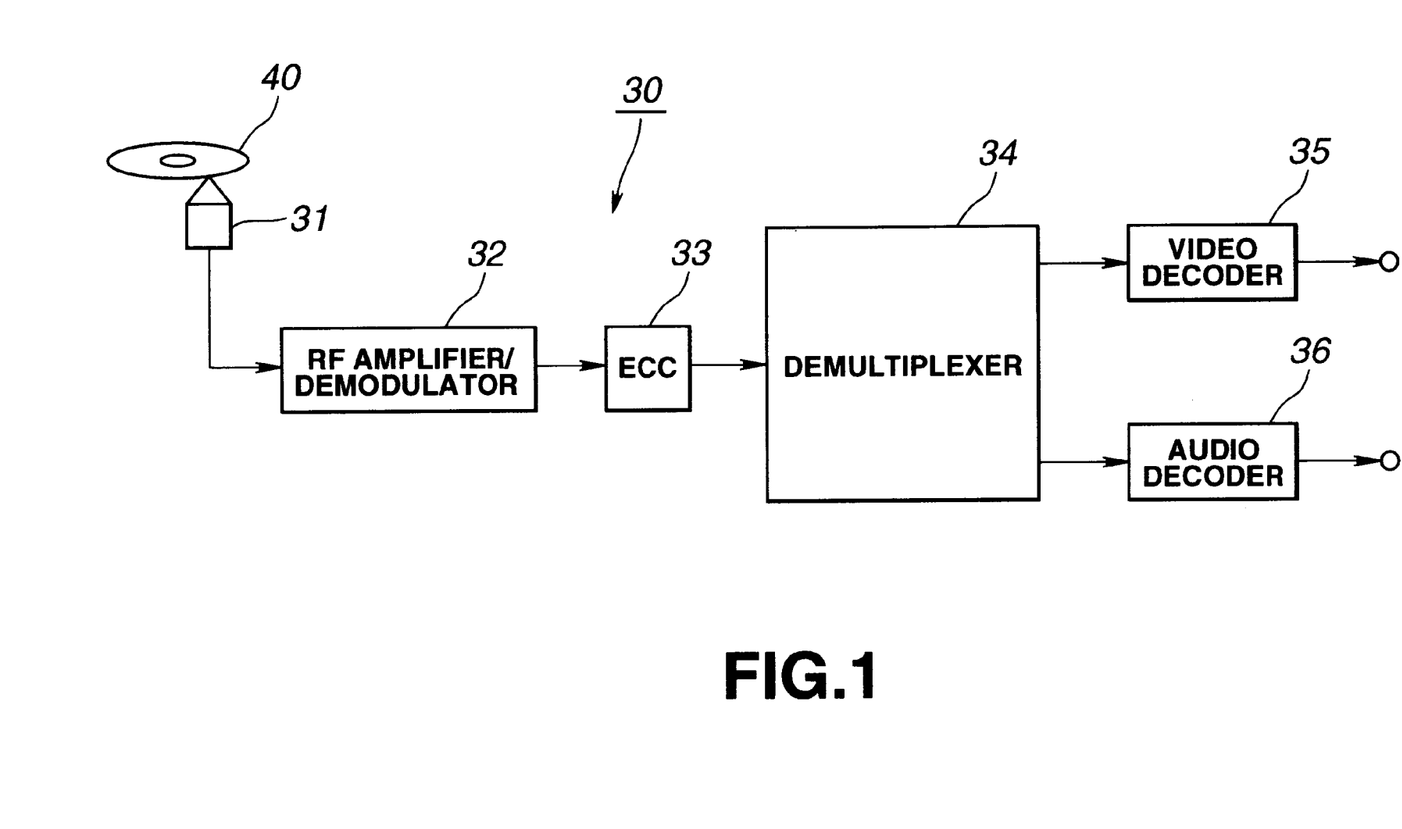
FIG. 1 is a block diagram of a conventional reproducing apparatus.
Figure 2:
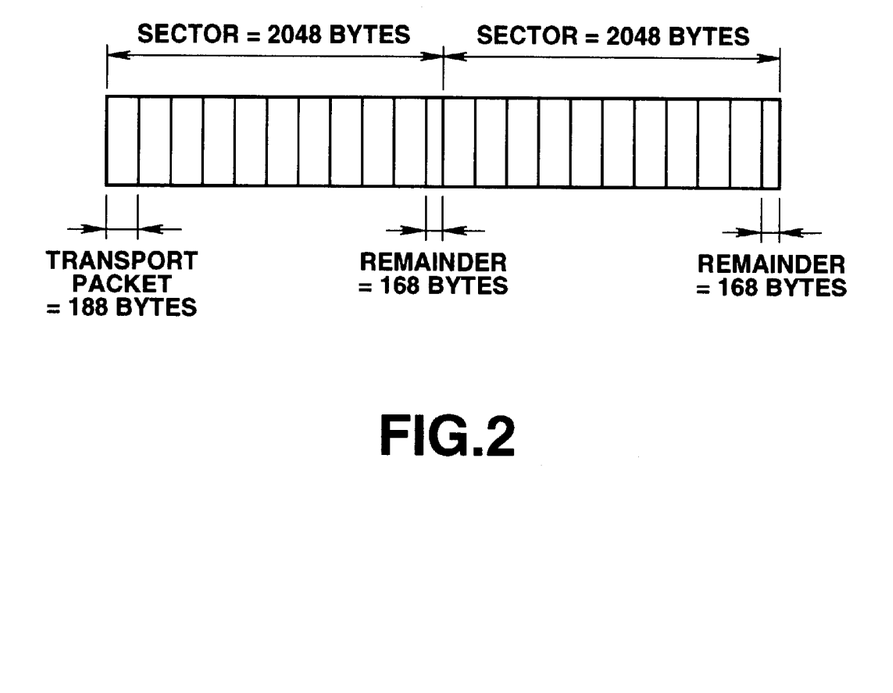
FIG. 2 is an explanatory drawing of a conventional recording medium, showing the configuration thereof.

In FIG. 1, the reproducing apparatus is generally indicated with a reference 30.

The reproducing apparatus 30 comprises a pickup 31 to read a transport stream recorded in an optical disc 40, an RF amplifier/demodulator circuit 32 to amplify and demodulate the transport stream read out of the optical disc 40, an ECC decoder 33 for error correction, a demultiplexer 34, a video decoder 35 to decode a compressed signal, and an audio decoder 36 to decode a compressed audio signal.

The above-mentioned RF amplifier/demodulator 32 is provided to amplify the received transport stream from the pickup 31, demodulate the amplified signal and supplies the demodulated signal to the ECC decoder 33 in which the received transport stream is subjected to an error correction based on an error correction code. The output of the ECC decoder 33 is supplied to the demultiplexer 34.

The demultiplexer 34 detects a PID of a transport packet supplied from the ECC decoder 33 to judge, according to a preset table, whether the PID is for video or audio. The demultiplexer 34 supplies the video decoder 35 with a data byte part of the transport packet having a video PID while supplying the audio decoder 36 with a data byte part of the transport packet having an audio PID. It should be noted that when the demultiplexer 34 detects a PID not included in the preset table, it will ignore the transport packet having such a PID.

Further the demultiplexer 34 is reset with a signal indicative of the top of a sector generated by the ECC decoder 33, processes 10 transport packets from the sector top, then skips remaining 168 bytes of one sector and repeats the detection of a PID of a transport packet supplied from the ECC decoder 33.

The above-mentioned video decoder 35 decodes a video transport packet supplied from the demultiplexer 34 to provide a video signal. Similarly, the audio decoder 36 decodes an audio transport packet from the demultiplexer 34 to provide an audio signal.

A recording medium such as CD-ROM, magneto-optic disc or the like has recorded therein data in each sector of a power of 2 of bytes such as 2048 bytes or 512 bytes in size suitable for an external recording medium for use with a computer, etc. The 2048 or 512 bytes are suitable for storage of data in such an external storage unit for a computer, etc. When a transport stream is recorded in such a recording medium, the size of transport packet of 188 bytes will be a problem.

For example, it is assumed here that a transport stream is recorded in a CD-ROM having a capacity of 2048 bytes per sector. In this case, since each of transport packets composing the transport stream is of 188 bytes in size, a redundant part takes place in one sector. More particularly, 10 transport packets each of 188 bytes can be recorded in each sector of 2048 bytes, but the sector will have a redundancy of 168 bytes. Namely, since the 188 byte is an aliquant part of the 2048 bytes, the sector will have a redundant part having no data. In the above example, the redundancy is as large as about 8%.

Since such a recording medium has a rather large redundancy of about 8% per sector, a transport stream cannot efficiently be recorded in the recording medium.

Also, even if a transport stream is recorded in the recording medium with no consideration given to the sector and transport packet sizes, the transport stream thus recorded cannot be reproduced for the transport stream is read and reproduced with respect to each sector.

SUMMARY OF THE INVENTION

Accordingly, the present invention has an object to overcome the above-mentioned drawbacks of the prior art by providing a recording apparatus and method for recording a transmission format signal with no occurrence of any redundant part, a recording medium capable of recording a large volume of transmission format signals, and a reproducing apparatus and method for reproducing the transmission format signals recorded in the recording medium.

The above object can be accomplished by providing an apparatus for recording into a recording medium designed to record data in each recording unit hereof a transmission format signal composed of a plurality of packets smaller in size than each recording unit of the recording medium, comprising, according to the present invention, a recording means for recording the transmission format signal in such a manner that no void will exist in each recording unit of the recording medium.

The above object can also be accomplished by providing a method of recording into a recording medium designed to record data in each recording unit thereof a transmission format signal composed of a plurality of packets smaller in size than each recording unit of the recording medium, comprising, according to the present invention, a step of recording the transmission format signal in such a manner that no void will exist in each recording unit of the recording medium.

The above object can also be accomplished by providing an apparatus for reproducing a transmission format signal composed of a plurality of packets smaller in size than each recording unit of the recording medium and recorded in a recording medium designed to record data in each recording unit thereof in such a manner that no void will exist in each recording unit of the recording medium, comprising, according to the present invention, a reproducing means for reproducing the transmission format signal from the recording medium, an extracting means for extracting the plurality of packets from the read transmission format signal, and a decoding means for decoding the transmission format signal packet by packet based on the extracted packets.

The above object can also be accomplished by providing a method of reproducing a transmission format signal composed of a plurality of packets smaller in size than each recording unit of the recording medium and recorded in a recording medium designed to record data in each recording unit thereof in such a manner that no void will exist in each recording unit of the recording medium, comprising, according to the present invention, the steps of reproducing the transmission format signal from the recording medium, extracting the plurality of packets from the read transmission format signal, and decoding the transmission format signal packet by packet based on the extracted packets.

The above object can also be accomplished by providing a recording medium designed to record data in each recording unit thereof, having recorded therein a transmission format signal composed of a plurality of packets smaller in size than each recording unit of the recording medium, in such a manner that no void will exist in each of the recording units thereof.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

Figure 3:
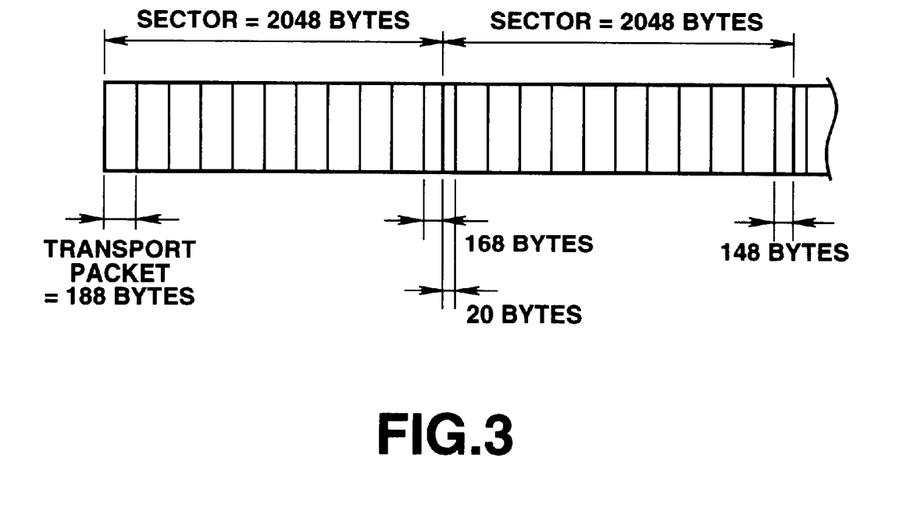
FIG. 3 is an explanatory drawing of a recording medium according to the present invention, showing the recorded transport stream in the recording medium.

FIG. 3 shows a recording medium to which the present invention is applied. The recording medium is an optical disc having recorded in each sector of 2048 bytes in size a transport packet of 188 bytes incorporated in an MPEG2 transport stream (will be referred to as "transport stream" hereinbelow) in such a manner that no void will exist in the sector.

Note that the transport stream is composed of more than one packet but there is no data between the transport packets.

It should also be noted that the transport packet has a sync_byte to discriminate the transport packet, a transport_error_indicator, payload_unit_start_indicator, transport priority, PID (packet_Identification), transport_scrambling_control, an adaptation_field_control, and data bytes of compression coded video and audio signals. Note that the sync_byte has a value of "01000111 (0×47 in hexadecimal notation)".

The optical disc has recorded in a first sector thereof 10 transport packets and 168 bytes of data being a part of the transport packet. Therefore, the first sector has recorded therein 2048 bytes (=188 bytes ×10+168 bytes) of data with no redundant part.

The optical disc has recorded in a sector thereof 20 bytes of data being the remainder of the above transport packet, 10 full transport packets, and 148 bytes of data being a part of the transport packet. Therefore, the second sector has recorded therein 2048 bytes (=20 bytes +188 bytes ×10 +148 bytes) with no redundant part.

Similarly, the optical disc has recorded in each of a third sector and subsequent sectors thereof a transport packet and a part of the packet in such a manner that no redundant part will exist therein. Thus, since the data amount per sector can be increased by eliminating a redundant part caused by recording of the transport stream, the optical disc can record more transport streams.

The embodiment of the present invention has been described concerning the elimination of redundant part in the optical disc. The redundant part can be reduced more than in the prior art as will be described below:

For alignment of transport packet in each sector, for example, 10.5 transport packets may be recorded in each sector in the optical disc. Alternatively, 10.75 transport packets may be recorded per sector in the optical disc. In such cases, the overheads (ratio of the redundant part with the rest) are 3.7% and 1.3%, respectively.

Otherwise, the sync byte at the top of the transport packet may be deleted for 2 bytes to fill 188 bytes of the transport packet closely in each sector. In this case, one sector has a redundant part of only 2 bytes (=2048 bytes−186 bytes×11).

The transport packet may be aligned by the unit of the ECC block. In an ECC block of 32 kbytes, for example, the redundant part is only 56 bytes of 32768 bytes (=32768 bytes −188 bytes ×176). Also, in an ECC block of 64 kbytes, only 112 bytes of 65536 bytes is a redundant part (=65536 bytes −188 bytes ×348).

Figure 4:
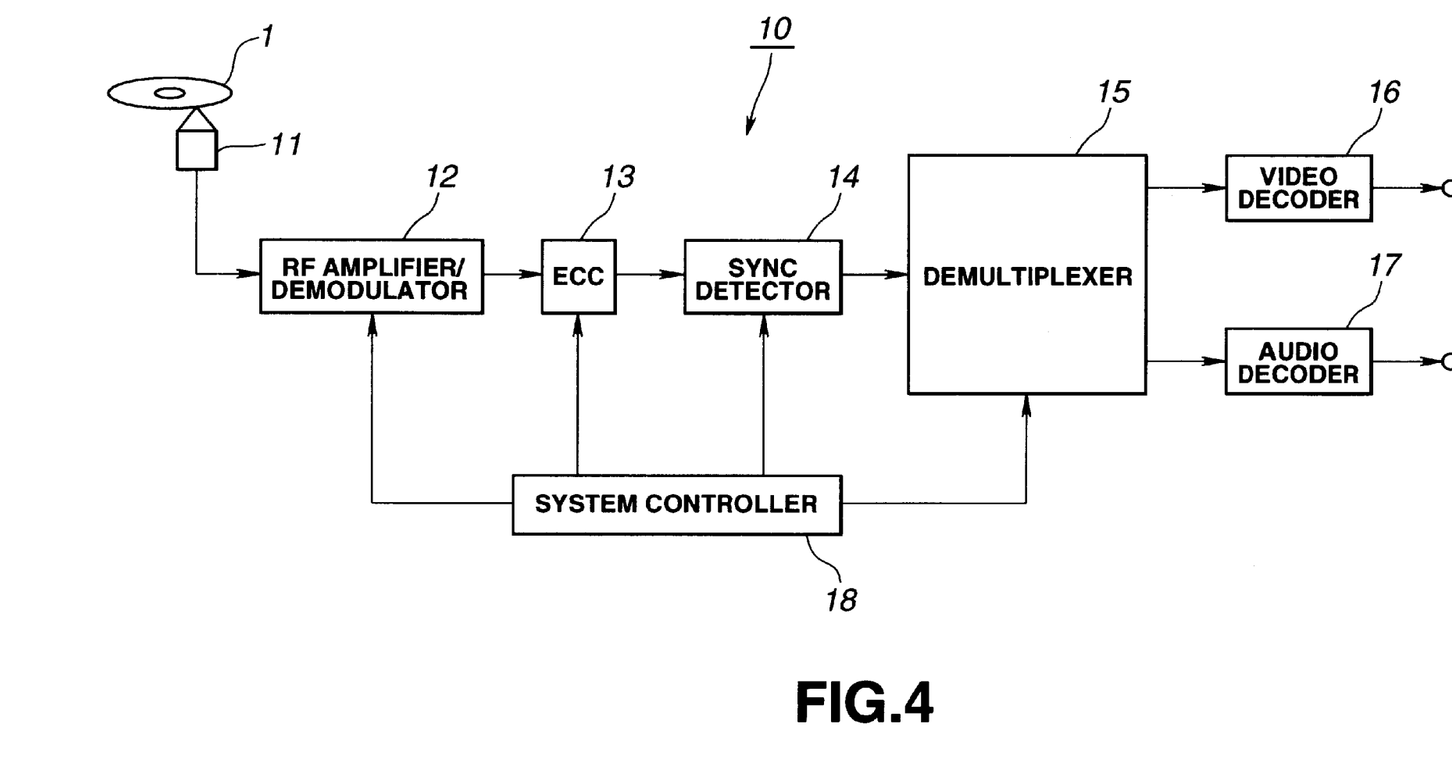
FIG. 4 is a block diagram of the reproducing apparatus according to the present invention.

Now, a reproducing apparatus according to the present invention for reproducing a transport stream recorded in an optical disc will be described herebelow with reference to FIG. 4. In FIG. 4, the reproducing apparatus is generally indicated with a reference 10 and the optical disc is with a reference 1.

As shown, the reproducing apparatus 10 comprises a pickup 11 to read a transport stream recorded in the optical disc 1, an RF amplifier/demodulator circuit 12 to amplify and demodulate the read transport stream, an ECC decoder 13 to correct a transport packet error, a sync detector circuit 14 to detect a sync byte, a demultiplexer 15 to separate the transport stream into video and audio signals, a video decoder 16 to decode the video signal, an audio decoder 17 to decode the audio signal, and a system controller 18 to control each circuit of the reproducing apparatus 10.

The RF amplifier/demodulator circuit 12 amplifies the transport stream read by the pickup 11 to a predetermined level, and further demodulates it by EFM, for example. The output of this circuit 12 is supplied to the ECC decoder 13.

The ECC decoder 13 corrects an error, if any, of transport packets composing together the transport stream based on the error correction code added to each transport packet.

The sync detector circuit 14 has a coincidence count register (not shown). Supplied with an instruction for sync byte check start from the system controller 18, the sync detector circuit 14 increments the coincidence count register each time it detects a sync byte, and judges, when the count in the coincidence count register reaches a predetermined number, that a sync byte has been detected.

Figure 5:
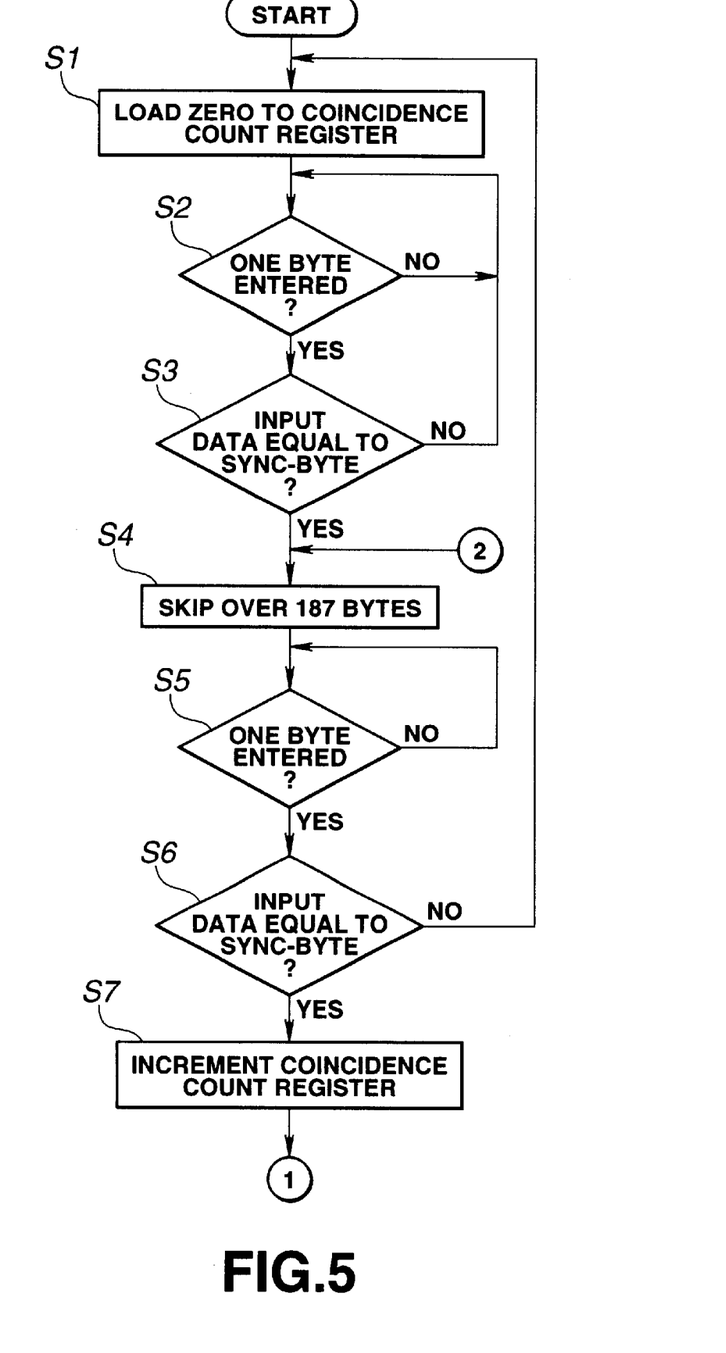
FIG. 5 is a flow chart showing the operations of the sync detector circuit in the reproducing apparatus in FIG. 4.
Figure 6:
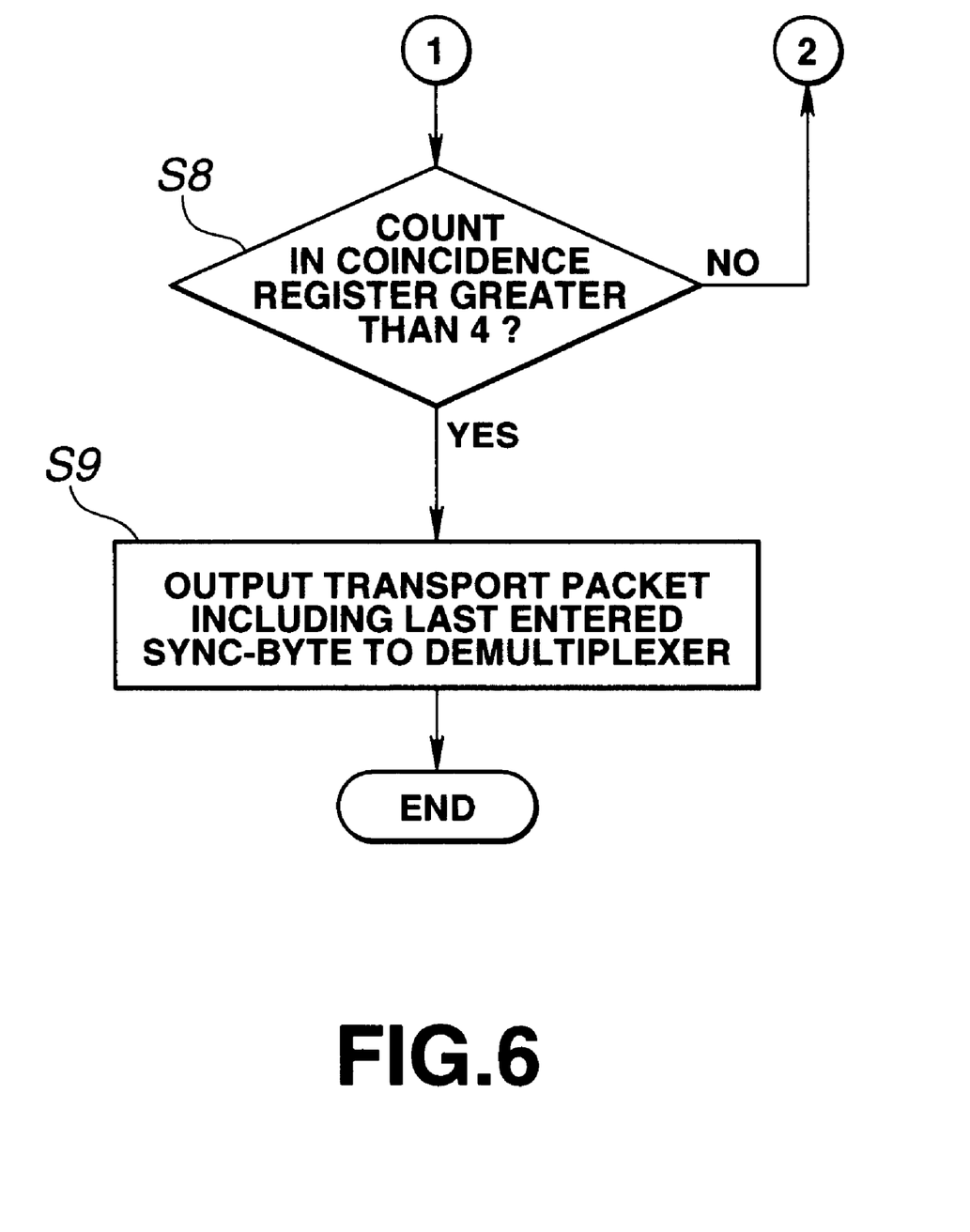
FIG. 6 is also a flow chart showing the operations of the sync detector circuit in the reproducing apparatus in FIG. 4.

More particularly, upon reception of the sync byte check starting instruction from the system controller 18, the sync detector circuit 14 will operate as in a step S1 and subsequent steps as shown in FIGS. 5 and 6:

At step S1 in FIG. 5, the sync detector 14 loads zero (0) into the coincidence count register, and goes to step S2.

At step S2, the sync detector 14 waits for entry of one byte. Upon entry of one byte, the sync detector 14 goes to step S3.

At step S3, the sync detector 14 judges whether the entered data for one byte of the transport packet is equal to the sync byte (0×47) or not. Upon judgment of the data to be equal to the sync byte, it goes to step S4. If not, namely, when the sync detector 14 judges the entered data not to be equal to the sync byte, it returns to step S2.

At step S4, the sync detector 14 skips 187 bytes and goes to step S5.

At step S5, the sync detector 14 waits for entry of one byte. Upon entry of one byte, the sync detector 14 goes to step S6.

At step S6, the sync detector 14 judges whether the entered data for one byte of the transport packet is equal to the sync byte (0×47) or not. Upon judgment of the data to be equal to the sync byte, it goes to step S7. If not, namely, when the sync detector 14 judges the entered data not to be equal to the sync byte, it returns to step S1.

At step S7, the coincidence count register counts up by one, and the sync detector 14 goes to step S8 shown in FIG. 6.

At step S8, the sync detector 14 judges whether the count in the coincidence count register is 4 or more. Upon judgment of the count to be 4 or more, the sync detector 14 goes to step S9.

Upon judgment of the count not to be 4 or more, the sync detector 14 returns to step S4. Namely, even when the sync detector 14 judges the entered data for one byte to be equal to the sync byte, it will skip a data of 187 bytes and repeats the operation of judging whether the entered data for one byte is equal to the sync byte or not. Thus, even if a same data as a one equal to the sync byte happens to be entered, it is possible to prevent the sync detector 14 from judging the data to be equal to the sync byte. In this embodiment, the sync detector 14 repeats the sync byte judgment four times, but the present invention is not limited to this number of judgments. The number may be 3 or 5.

At step S9, the sync detector 14 supplies the demultiplexer 15 with a transport packet having a finally entered sync byte, and terminates the operation of transport packet extraction.

By effecting the operations in steps S1 through S9, the sync detector circuit 14 can thus extract transport packets of a transport stream recorded, with no void, in each sector of the optical disc 1.

When supplied with a first transport packet from the sync detector circuit 14, the demultiplexer 15 extracts transport packets from a transport stream by segmenting the remainder of the transport stream except for the first transport packet at every 188 bytes. The demultiplexer 15 detects PIDs of the transport packets and judges, according to a predetermined table, whether the PIDs are for video or audio. The demultiplexer 15 supplies the video decoder 16 with a data byte part of each transport packet having a video PID while supplying the audio decoder 17 with a data type part of each transport packet having an audio PID. It should be noted that when the demultiplexer 15 detects any PID not included in a predetermined table, it will ignore the transport packet having such a PID.

The video decoder 16 decodes the data byte of a video transport packet supplied from the demultiplexer 15 to provide a video signal. Similarly, the audio decoder 17 decodes the data byte of an audio transport packet supplied from the demultiplexer 15 to provide an audio signal.

As having been described in the foregoing, the reproducing apparatus 10 can produce video and audio signals by reproducing the transport stream recorded, with no void, in each sector of the optical disc 1.

In this embodiment of the present invention, the sync detector circuit 14 discards at least three transport packets until it extracts a first transport packet. However, such a waste can be reduced by providing the sync detector circuit 14 with an RAM of several kilobytes.

More particularly, a first transport stream read by the pickup 11 is temporarily stored into the RAM via the RF amplifier/demodulator circuit 12 and ECC decoder 13. When a fourth sync byte is detected, data after a transport packet having a first detected sync byte is read from the RAM.

The aforementioned reproducing apparatus 10 can reproduce even a transport stream recorded in the recording medium and having some redundancy as having been mentioned above, by detecting the sync byte of each transport packet.

Figure 7:
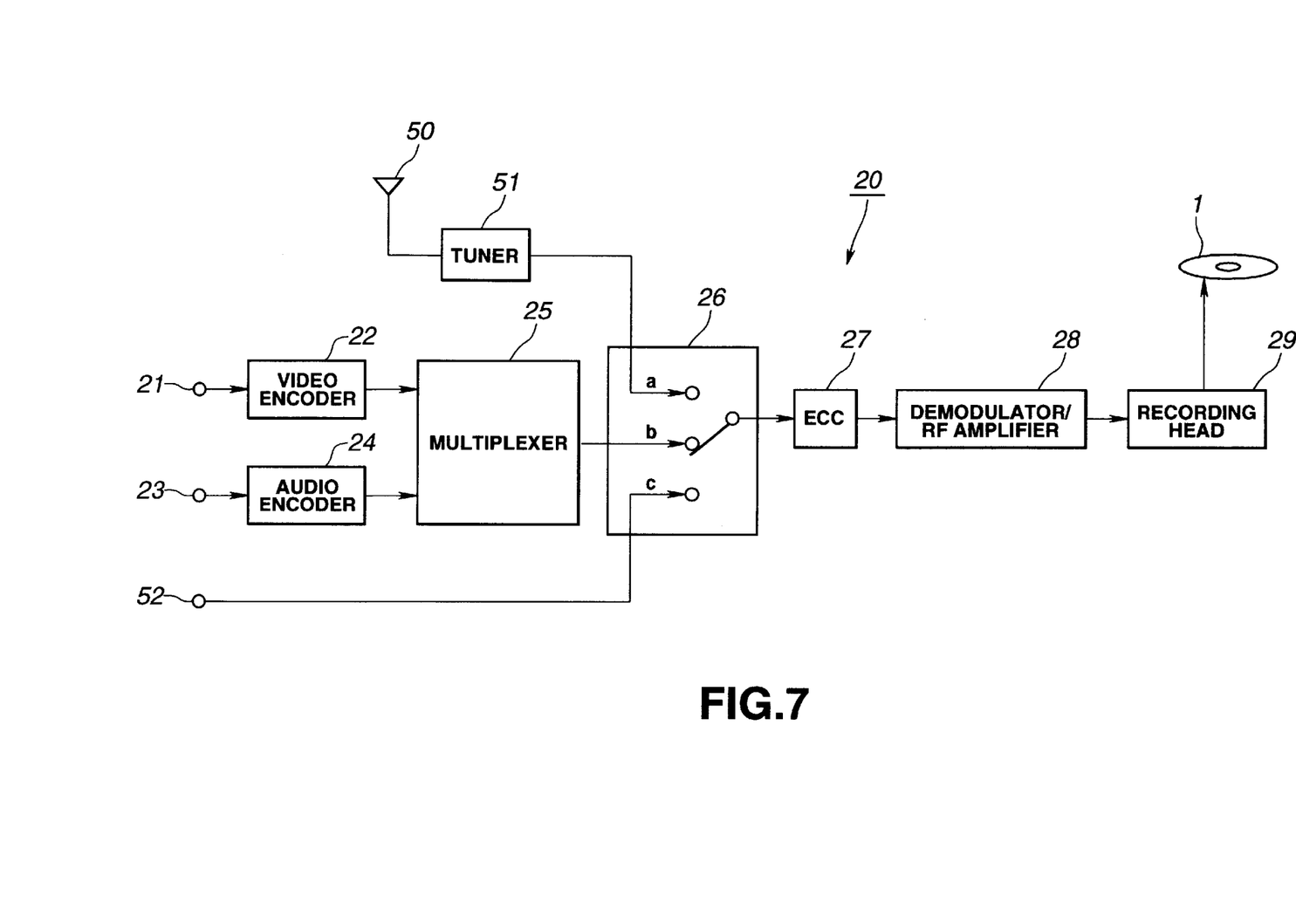
FIG. 7 is a block diagram of the recording apparatus according to the present invention.

FIG. 7 shows the recording apparatus according to the present invention. It is adapted to record a transport stream in a sector of the optical disc 1 in such a manner that no redundant part will exist in the sector. The recording apparatus is generally indicated with a reference 20 in FIG. 7.

As shown, the recording apparatus 20 comprises a video encoder 22 to encode a video signal, an audio encoder 24 to encode an audio signal, a multiplexer 25 to generate a transport stream, a switching circuit 26 to select a transport stream input, an ECC encoder 27 to add an error correction code, a demodulator/RF amplifier circuit 28, and a recording head 29 to record a transport stream into the optical disc 1.

The video encoder 22 provides a compression coding, according to MPEG2, for example, of a video signal supplied through a terminal 21, and supplies it to the multiplexer 25. The audio encoder 24 provides a compression coding of an audio signal supplied through a terminal 23, and supplies it to the multiplexer 25. The multiplexer 25 provides a time-division multiplexing of such a compression-coded video signal to generate transport packets and supplies a transport stream composed of these transport packets to a terminal b of the switching circuit 26.

The switching circuit 26 has terminals a to c, and select any one of transport streams supplied to these terminals for delivery to the ECC encoder 27. It should be noted that the switching circuit 26 is supplied at the terminal a thereof with a satellite broadcasting transport stream received by a tuner 51 via an antenna 50 and that the switching circuit 26 is supplied with at the terminal c thereof with a transport stream incoming via an external input terminal 52.

The ECC encoders 27 segments a transport stream from the switching circuit 26 at every predetermined ECC blocks, and add an error correction code to each such segment, and supplies it to the demodulator/RF amplifier circuit 28. The circuit 28 provides an EFM modulation, for example, of the transport stream and supplies the modulated transport stream to the recording head 29.

The recording head 29 records the transport stream closely into each sector of 2048 bytes, for example, of the recording medium 1 in such a manner that no void will exist there.

Therefore, transport packets of 188 bytes composing together the transport stream are recorded closely into the optical disc 1 in such a manner that each sector of 2048 bytes will have no redundancy as shown in FIG. 3.

In the foregoing, the embodiment of the present invention has been described concerning a transport stream prescribed in the MPEG2 system as the transmission format signal composed of the plurality of packets. However, it should be appreciated that the present invention is not limited to the MPEG2 system which has been taken just by way of example. An ATM or STM data composed of a plurality of cells may of course be adopted as the transmission format signal.

Also, the present inventions have been described in the above concerning an optical disc 1 such as CD-ROM, magneto-optic disc or the like. Of course, however, the present invention may use any other recording medium such as hard disc, flexible disc, etc.

As having been described in the foregoing, the recording apparatus and method according to the present invention adopt the recording means for recording the transmission format signal in such a manner that no void will exist in each recording unit of the recording medium, thereby permitting to record a larger volume of transmission format signals than the conventional recording apparatus and method.

The reproducing apparatus and method according to the present invention can reproduce a transmission format signal recorded in a recording medium designed to record data in each recording unit thereof in such a manner that no void will exist in each recording unit of the recording medium, by extracting the plurality of packets from the read transmission format signal, and decoding the transmission format signal packet by packet based on the extracted packets The recording medium according to the present invention designed to record a transmission format signal composed of a plurality of packets smaller than each recording unit thereof in which the above data is to be recorded, in such a manner that no void will exist in each of the recording units thereof, thereby permitting to record a larger volume of transmission format signals than the conventional recording medium.

What is claimed is:

1. A reproducing apparatus for reproducing a transmission format signal composed of a plurality of packets smaller in size than each recording unit of the recording medium and recorded in a recording medium designed to record data in each recording unit thereof in such a manner that no void will exist in each recording unit of the recording medium, comprising:

reproducing means for reproducing the transmission format signal from the recording medium;

packet extracting means for detecting a sync information from the transmission format signal and for extracting a packet when the sync information has been detected from the transmission format signal a predetermined number of times for each predetermined volume of data such that the extracted packet has a finally detected sync information; and decoding means for decoding the transmission format signal packet based on the extracted packets.

2. A reproducing apparatus for reproducing a transmission format signal composed of a plurality of packets smaller in size than each recording unit of the recording medium and recorded in a recording medium designed to record data in each recording unit thereof in such a manner that no void will exist in each recording unit of the recording medium, comprising:

reproducing means for reproducing the transmission format signal from the recording medium;

packet extracting means for detecting a sync information from the transmission format signal and for extracting the plurality of packets from the read transmission format signal;

storage means for temporarily storing a transmission format signal reproduced by the reproducing means, the storage means being adapted to read, when the sync information has been detected from the transmission format signal a predetermined number of times for each predetermined volume data, the transmission format signal from the storage means and extract a packet having an initially detected sync information; and decoding means for decoding the transmission format signal packet by packet based on the extracted packets.

3. A reproducing method of reproducing a transmission format signal composed of a plurality of packets smaller in size than each recording unit of the recording medium and recorded in a recording medium designed to record data in each recording unit thereof in such a manner that no void will exist in each recording unit of the recording medium, comprising the steps of:

reproducing the transmission format signal from the recording medium:

detecting sync information from the transmission format signal;

extracting the plurality of packets based on the sync information detected from the reproduced transmission format signal such that when the sync information has been detected from the transmission format signal a predetermined number of times for each predetermined volume of data, a packet having a finally detected sync information is extracted; and decoding the transmission format signal packet by packet based on the extracted packets.

4. A reproducing method of reproducing a transmission format signal composed of a plurality of packets smaller in size than each recording unit of the recording medium and recorded in a recording medium designed to record data in each recording unit of the recording medium, comprising the steps of:

reproducing the transmission format signal from the recording medium:

detecting sync information from the reproduced transmission format signal;

temporarily storing the reproduced transmission format signal;

reading the stored transmission format signal when the sync information has been detected from the transmission format signal a predetermined number of times for each predetermined volume of data;

extracting from the read transmission format signal a packet having an initially detected sync information; and decoding the transmission format signal packet by packet based on the extracted packets.

* * * * *